United States Patent
Zuo (10) Patent No.: US 10,748,495 B2
(45) Date of Patent: Aug. 18, 2020

(54) PIXEL DRIVING CIRCUIT AND LIQUID CRYSTAL DISPLAY CIRCUIT WITH THE SAME

(71) Applicant: Wuhan China Star Optoelectronics Technology Co., Ltd., Wuhan (CN)

(72) Inventor: Qingcheng Zuo, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 86 days.

(21) Appl. No.: 16/074,453

(22) PCT Filed: Apr. 27, 2018

(86) PCT No.: PCT/CN2018/084846
§ 371 (c)(1),
(2) Date: Aug. 1, 2018

(87) PCT Pub. No.: WO2019/196140
PCT Pub. Date: Oct. 17, 2019

(65) Prior Publication Data
US 2019/0318699 A1    Oct. 17, 2019

(30) Foreign Application Priority Data
Apr. 12, 2018  (CN) .......................... 2018 1 0323400

(51) Int. Cl.
| G09G 3/36 | (2006.01) |
| G02F 1/1362 | (2006.01) |
| G02F 1/133 | (2006.01) |
| G02F 1/1368 | (2006.01) |

(52) U.S. Cl.
CPC ......... *G09G 3/3607* (2013.01); *G02F 1/1368* (2013.01); *G02F 1/13306* (2013.01); *G02F 1/136286* (2013.01); *G09G 3/3677* (2013.01); *G09G 3/3688* (2013.01); *G09G 2300/0426* (2013.01); *G09G 2300/0452* (2013.01); *G09G 2310/0297* (2013.01); *G09G 2310/08* (2013.01)

(58) Field of Classification Search
CPC .. G09G 3/3607; G09G 3/3688; G09G 3/3677; G09G 2310/08; G09G 2300/0452; G09G 2300/0426; G09G 2310/0297; G02F 1/1368; G02F 1/13306; G02F 1/136286
See application file for complete search history.

(56) References Cited

U.S. PATENT DOCUMENTS

| 9,269,321 | B2* | 2/2016 | Jamshidi-Roudbari ..................... G09G 3/3688 |
| 9,647,003 | B2* | 5/2017 | Lee ....................... H01L 27/1259 |
| 2007/0159438 | A1* | 7/2007 | Cho ........................ G09G 3/3648 345/98 |

(Continued)

*Primary Examiner* — Bryan Earles (57) ABSTRACT

A pixel driving circuit is used to drive a pixel structure having a plurality of pixel units. The pixel driving circuit includes data lines; selecting circuits having a data input terminal connected to one of the data lines, a first output terminal connected to a red subpixel unit of a pixel unit, a second output terminal connected to a green subpixel unit of the pixel unit, and a third output terminal connected to a blue subpixel unit of the pixel unit; scanning lines; voltage-variation circuits having an input terminal to receive the scanning signal, an output terminal connected to one of scanning lines. Each of the voltage-variation circuits is selectively operable in a voltage-regulated state or a conduct state.

16 Claims, 4 Drawing Sheets

(56) References Cited

U.S. PATENT DOCUMENTS

| | | | |
|---|---|---|---|
| 2007/0188523 A1* | 8/2007 | Lee | G09G 3/3614 345/690 |
| 2009/0207119 A1* | 8/2009 | Han | G09G 3/3659 345/98 |
| 2011/0050671 A1* | 3/2011 | Sah | G09G 3/3651 345/211 |
| 2018/0090046 A1* | 3/2018 | Hong | G09G 3/3614 |

* cited by examiner

Red subpixel
Green subpixel
Blue subpixel
FIG. 6

PIXEL DRIVING CIRCUIT AND LIQUID CRYSTAL DISPLAY CIRCUIT WITH THE SAME

RELATED APPLICATIONS

This application is a National Phase of PCT Patent Application No. PCT/CN2018/084846 having International filing date of Apr. 27, 2018, which claims the benefit of priority of Chinese Patent Application No. 201810323400.4 filed on Apr. 12, 2018. The contents of the above applications are all incorporated by reference as if fully set forth herein in their entirety.

FIELD AND BACKGROUND OF THE INVENTION

The present disclosure relates to the field of liquid crystal display technology, and more particularly, to a pixel driving circuit and a liquid crystal display circuit with the pixel driving circuit.

Figure 1:
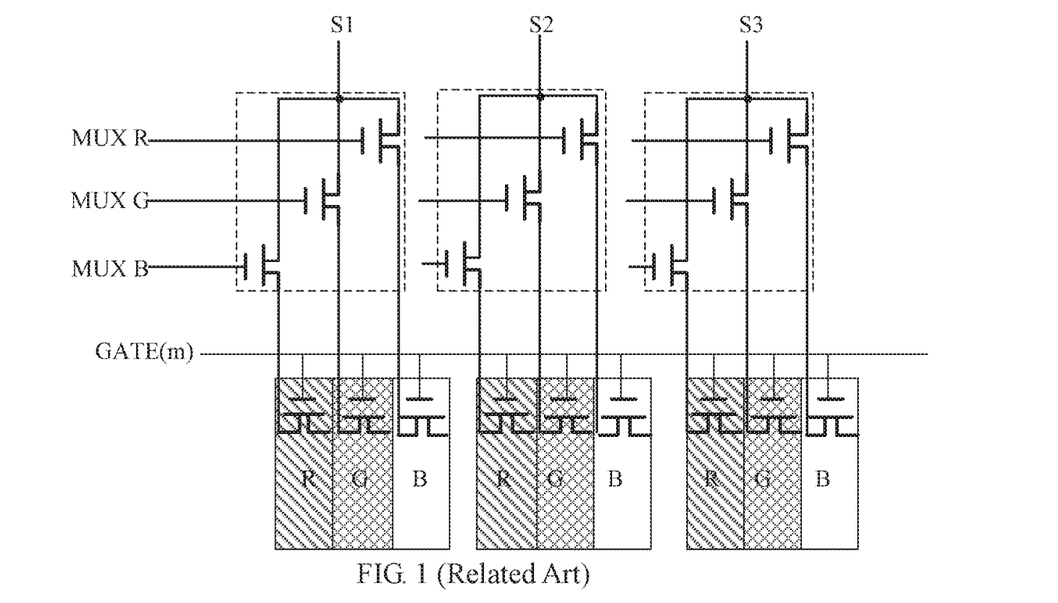
FIG. 1 illustrates a circuit diagram of a pixel driving circuit according to a related art.
Figure 2:
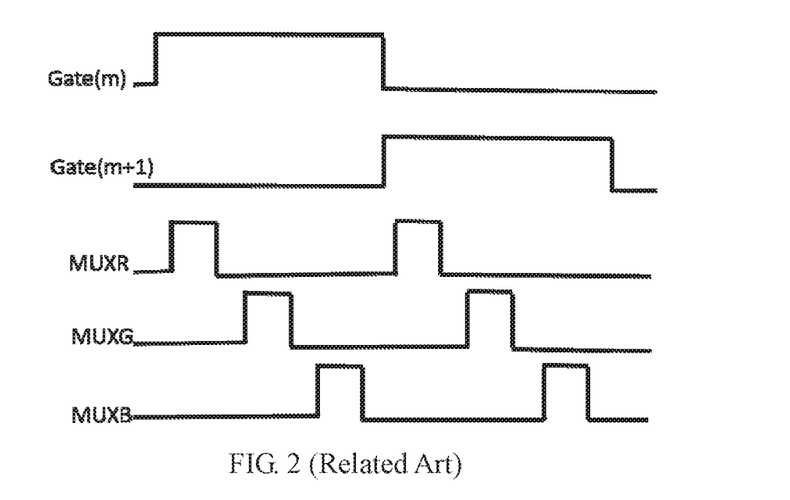
FIG. 2 illustrates a timing diagram of signals applied on the pixel driving circuit of FIG. 1.
Figure 3:
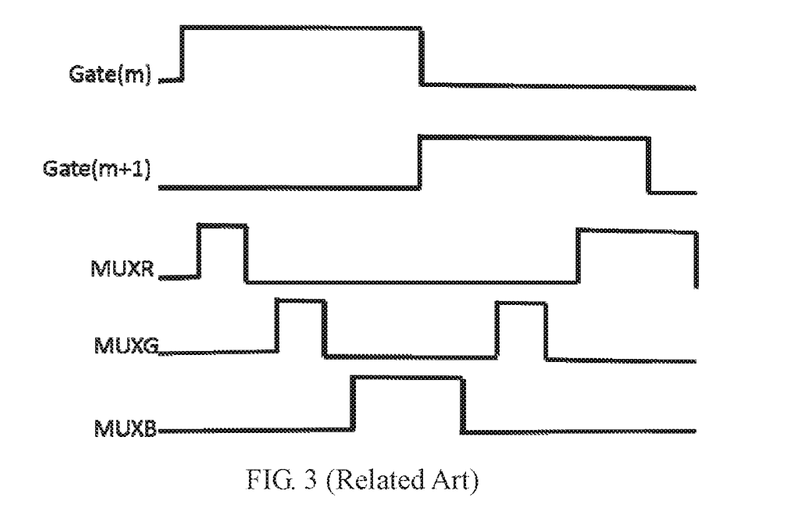
FIG. 3 illustrates another timing diagram of signals applied on the pixel driving circuit of FIG. 1.

With the rapid development of small and medium-sized electronic display industry, consumers have stricter requirements for quality of medium and small-sized LCD liquid crystal displays such as resolution. Improvements in display quality are inextricably linked to the transmission rate of display data and signal integrity. FIG. 1 illustrates a signal-driven structure of 1:3 which is more commonly adopted in small and medium-sized liquid-crystal display (LCD) screens of the related art. FIG. 2 illustrates a Demux driving timing of RGB-RGB corresponding to the signal-driven structure. A shortcoming of the driving timing is that MUX is turned on at a higher frequency, causing higher power consumption of the MUX circuit. As for a small-sized display screen such as a cellphone, a large amount of power consumption is one of fatal impediments. Therefore, research and design personnel in the industry proposed a Demux driving timing of RGB-BGR, as shown in FIG. 3. As FIG. 3 illustrates, the driving timing may reduce the frequency of turning on MUXR and MUXB by half, thereby greatly reducing the power consumption of the LCD display screen.

Figure 4:
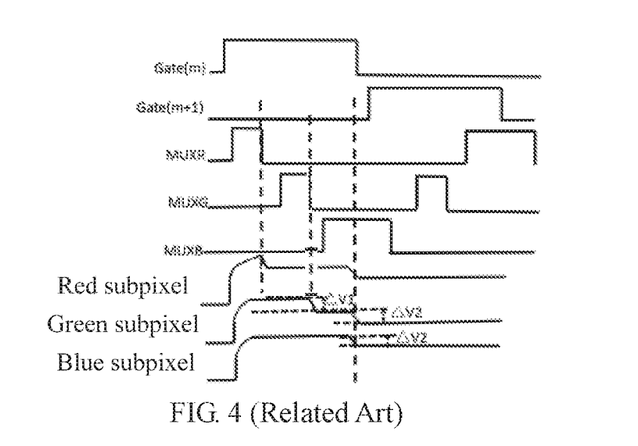
FIG. 4 illustrates another timing diagram of signals applied on the pixel driving circuit of FIG. 1 and voltage drops applied on a pixel unit.

Another problem for the driving timing is that the voltage level of the R data has two Drops because of the coupling effect of capacitance, as FIG. 4 illustrates. The first Drop is a decrease ΔV1 when MUXR is turned off. The second Drop is a decrease ΔV2 when Gate is turned off. G subpixel is the same at this time. But for the B data, only one Drop is on the first row; that is, the Drop is a decrease ΔV2 only when Gate is turned off. To sum up, the data voltage imposed on the R\G subpixel and the data voltage imposed on the B subpixel is different in the process of display so that the voltage imposed on the R\G subpixel and the voltage imposed on the B subpixel are different at last. Even if the display effect is the same grayscale, the display brightness of the R\G subpixel is different from the display brightness of the B subpixel, which shows color shift when the consumers view the images.

Therefore, it is urgent to improve the defected related art.

SUMMARY OF THE INVENTION

An object of the present disclosure is to propose a pixel driving circuit with advantages of low color shift and high-quality display standards and a liquid crystal display circuit with the pixel driving circuit.

In one aspect of the present disclosure, a pixel driving circuit is configured to drive a pixel structure having a plurality of pixel units. Each of the plurality of pixel units comprises a red subpixel unit, a green subpixel unit, and a blue subpixel unit. The pixel driving circuit comprises: a plurality of data lines, an input terminal of each of the plurality of data lines receiving a data signal; a plurality of selecting circuits, each of the selecting circuits comprising a data input terminal connected to one of the plurality of data lines, a first output terminal connected to a red subpixel unit of a pixel unit, a second output terminal connected to a green subpixel unit of the pixel unit, and a third output terminal connected to a blue subpixel unit of the pixel unit; a plurality of scanning lines, each connected to one of the subpixel units of the pixel units; a plurality of voltage-variation circuits, each of the voltage-variation circuits comprising an input terminal configured to receive the scanning signal, an output terminal connected to one of the plurality of scanning lines, wherein each of the plurality of voltage-variation circuits is selectively operable in a voltage-regulated state or a conduct state. In response to a transition of signal output by the first output terminal from a high voltage level to a low voltage level or a transition of signal output by the second output terminal from the high voltage level to the low voltage level, the voltage-variation circuit switches to the voltage-regulated state for a first predetermined duration so that scanning signal output to the subpixel unit shifts from the high voltage level to the low voltage level, and the voltage-variation circuit switches to be the conduct state after the first predetermined duration. The voltage-variation circuit is a gate circuit comprising a first input terminal configured to receive a scanning signal, a second input terminal configured to receive a square-wave signal, and an output terminal connected to one of the scanning lines. The selecting circuit comprises a first thin-film transistor (TFT), a second TFT, and a third TFT; an input terminal of the first TFT, an input terminal of the second TFT, and an input terminal of the third TFT are connected to one of the plurality of data lines; an output terminal of the first TFT is connected to the red subpixel unit of the pixel unit; the output terminal of the second TFT is connected to the green subpixel unit of the pixel unit; the output terminal of the third TFT is connected to the blue subpixel unit of the pixel unit.

According to the present disclosure, the gate circuit is an AND gate; the square-wave signal is at low voltage level on the voltage-regulated state; the square-wave signal is at high voltage level on the conduct state.

According to the present disclosure, the pixel driving circuit further comprises a selecting controller connected to a gate of the first TFT, a gate of the second TFT, and a gate of the third TFT.

According to the present disclosure, all of the first TFT, second TFT and third TFT are N-channel metal oxide semiconductor (NMOS) transistors.

In another aspect of the present disclosure, a pixel driving circuit is configured to drive a pixel structure having a plurality of pixel units. Each of the plurality of pixel units comprises a red subpixel unit, a green subpixel unit, and a blue subpixel unit. The pixel driving circuit comprises: a plurality of data lines, an input terminal of each of the plurality of data lines receiving a data signal; a plurality of selecting circuits, each of the selecting circuits comprising a data input terminal connected to one of the plurality of data lines, a first output terminal connected to a red subpixel unit of a pixel unit, a second output terminal connected to a green subpixel unit of the pixel unit, and a third output terminal connected to a blue subpixel unit of the pixel unit; a plurality of scanning lines, each connected to one of the subpixel units of the pixel units; a plurality of voltage-variation circuits, each of the voltage-variation circuits comprising an input terminal configured to receive the scanning signal, an output terminal connected to one of the plurality of scanning lines, wherein each of the plurality of voltage-variation circuits is selectively operable in a voltage-regulated state or a conduct state. In response to a transition of signal output by the first output terminal from a high voltage level to a low voltage level or a transition of signal output by the second output terminal from the high voltage level to the low voltage level, the voltage-variation circuit switches to the voltage-regulated state for a first predetermined duration so that scanning signal output to the subpixel unit shifts from the high voltage level to the low voltage level, and the voltage-variation circuit switches to be the conduct state after the first predetermined duration.

According to the present disclosure, the voltage-variation circuit is a gate circuit comprising a first input terminal configured to receive a scanning signal, a second input terminal configured to receive a square-wave signal, and an output terminal connected to one of the scanning lines.

According to the present disclosure, the gate circuit is an AND gate; the square-wave signal is at low voltage level on the voltage-regulated state; the square-wave signal is at high voltage level on the conduct state.

According to the present disclosure, the selecting circuit comprises a first thin-film transistor (TFT), a second TFT, and a third TFT; an input terminal of the first TFT, an input terminal of the second TFT, and an input terminal of the third TFT are connected to one of the plurality of data lines; an output terminal of the first TFT is connected to the red subpixel unit of the pixel unit; the output terminal of the second TFT is connected to the green subpixel unit of the pixel unit; the output terminal of the third TFT is connected to the blue subpixel unit of the pixel unit.

According to the present disclosure, the pixel driving circuit further comprises a selecting controller connected to a gate of the first TFT, a gate of the second TFT, and a gate of the third TFT.

According to the present disclosure, all of the first TFT, second TFT and third TFT are N-channel metal oxide semiconductor (NMOS) transistors.

In still another aspect of the present disclosure, a liquid crystal display circuit comprising a pixel driving circuit and a pixel structure having a plurality of pixel units. Each of the plurality of pixel units comprises a red subpixel unit, a green subpixel unit, and a blue subpixel unit. The pixel driving circuit comprises: a plurality of data lines, an input terminal of each of the plurality of data lines receiving a data signal; a plurality of selecting circuits, each of the selecting circuits comprising a data input terminal connected to one of the plurality of data lines, a first output terminal connected to a red subpixel unit of a pixel unit, a second output terminal connected to a green subpixel unit of the pixel unit, and a third output terminal connected to a blue subpixel unit of the pixel unit; a plurality of scanning lines, each connected to one of the subpixel units of the pixel units; a plurality of voltage-variation circuits, each of the voltage-variation circuits comprising an input terminal configured to receive the scanning signal, an output terminal connected to one of the plurality of scanning lines, wherein each of the plurality of voltage-variation circuits is selectively operable in a voltage-regulated state or a conduct state. In response to a transition of signal output by the first output terminal from a high voltage level to a low voltage level or a transition of signal output by the second output terminal from the high voltage level to the low voltage level, the voltage-variation circuit switches to the voltage-regulated state for a first predetermined duration so that scanning signal output to the subpixel unit shifts from the high voltage level to the low voltage level, and the voltage-variation circuit switches to be the conduct state after the first predetermined duration.

According to the present disclosure, the voltage-variation circuit is a gate circuit comprising a first input terminal configured to receive a scanning signal, a second input terminal configured to receive a square-wave signal, and an output terminal connected to one of the scanning lines.

According to the present disclosure, the gate circuit is an AND gate; the square-wave signal is at low voltage level on the voltage-regulated state; the square-wave signal is at high voltage level on the conduct state.

According to the present disclosure, the selecting circuit comprises a first thin-film transistor (TFT), a second TFT, and a third TFT; an input terminal of the first TFT, an input terminal of the second TFT, and an input terminal of the third TFT are connected to one of the plurality of data lines; an output terminal of the first TFT is connected to the red subpixel unit of the pixel unit; the output terminal of the second TFT is connected to the green subpixel unit of the pixel unit; the output terminal of the third TFT is connected to the blue subpixel unit of the pixel unit.

According to the present disclosure, the pixel driving circuit comprises a selecting controller connected to a gate of the first TFT, a gate of the second TFT, and a gate of the third TFT.

According to the present disclosure, all of the first TFT, second TFT and third TFT are N-channel metal oxide semiconductor (NMOS) transistors.

The red/green/blue subpixel units (R/G/B subpixel units) are charged under the condition of the same voltage drop with the pixel driving circuit to ensure that the grayscale displayed by each of the subpixels is consistent, thereby preventing the color shift from occurring. Inconsistent voltage usually causes color shift.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

FIG. 1 illustrates a circuit of a pixel driving circuit according to a related art.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

In the disclosure, it is should be understood that spatially relative terms, such as "center", "longitudinal", "lateral", "length", "width", "above", "below", "front", "back", "left", "right", "horizontal", "vertical", "top", "bottom", "inner", "outer", "clockwise", "counterclockwise", "axial", "radial", "circumferential", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The spatially relative terms are not limited to specific orientations depicted in the figures. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachably connect," and "integrally connect" are all possible. It is also possible that "mechanically connect," "electrically connect," and "mutually communicate" are used. It is also possible that "directly couple," "indirectly couple via a medium," and "two components mutually interact" are used.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

In the present disclosure, unless definite regulation and limitation, a first feature "above" or "under" a second feature may include direct contact of the first and second features. A first feature "above" or "under" a second feature may also include first feature contacting the second feature via other features between the first and second features rather than contact directly. Moreover, the first feature "above," "over," or "on" the second feature means that the first feature is over or above the second feature or that the level of the first feature is merely higher than the level of the second feature. The first feature "below," "under," or "beneath" the second feature means that the first feature is under or below the second feature or that the level of the first feature is merely lower than the level of the second feature.

Figure 5:
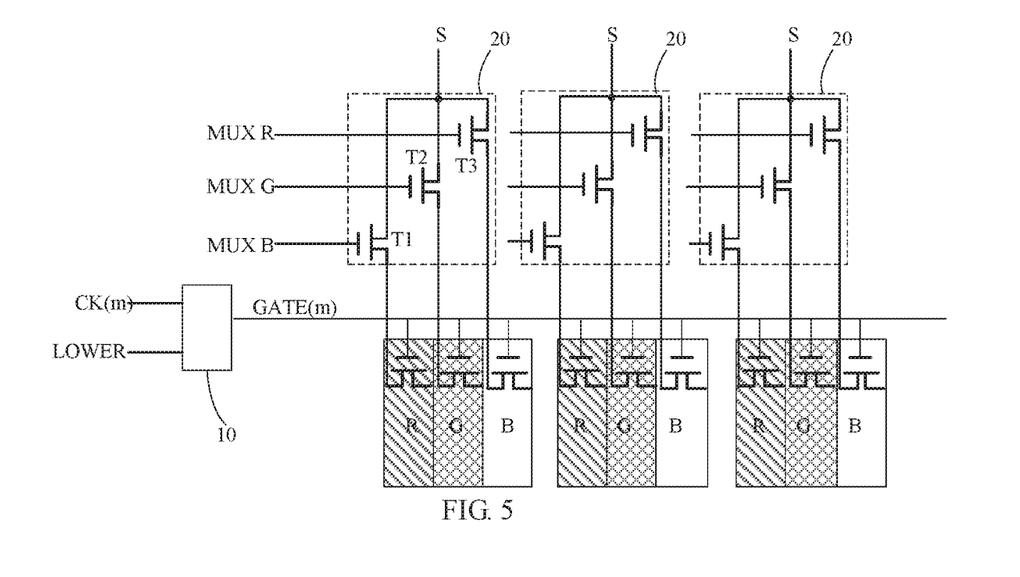
FIG. 5 illustrates a circuit diagram of a pixel driving circuit according to an embodiment of the present disclosure.

Please refer to FIG. 5 illustrating a schematic diagram of the structure of a pixel driving circuit according to one embodiment of the present disclosure. The pixel driving circuit is configured to drive a pixel structure. The pixel structure includes a plurality of pixel units 30 arranged in a matrix. Each of the plurality of pixel units 30 includes three subpixel units, a red subpixel unit, a green subpixel unit, and a blue subpixel unit.

The pixel driving circuit includes a plurality of voltage-variation circuits 10, a plurality of data lines S, a plurality of selecting circuits 20, and a plurality of scanning lines GATE(m).

An input terminal of each of the plurality of data lines S receives a data signal.

Each of the selecting circuits 20 includes a data input terminal, a first output terminal, a second output terminal, and a third output terminal. The data input terminal is connected to the output terminal of one of the plurality of data lines S. The first output terminal is connected to the corresponding red subpixel unit of the pixel unit. The second output terminal is connected to the corresponding green subpixel unit of the pixel unit. The third output terminal is connected to the corresponding blue subpixel unit of the pixel unit.

Each of the plurality of scanning lines GATE(m) is connected to each of the plurality of subpixel units of one or more pixel unit.

An input terminal of each of the plurality of voltage-variation circuits 10 receives the scanning signal. An output terminal of each of the plurality of voltage-variation circuits 10 is connected to a scanning line. Each of the plurality of voltage-variation circuits 10 is configured to process the scanning signal and afterwards transmits the processed scanning signal to one of the plurality of scanning lines GATE(m).

Each of the plurality of voltage-variation circuits 10 may be operable in a voltage-regulated state or a conduct state. When a signal output through the first output terminal of the selecting circuit 20 shifts from high voltage level to low voltage level or a signal output through the second output terminal of the selecting circuit 20 shifts from high voltage level to low voltage level, the voltage-variation circuit 10 shifts to be voltage-regulated and keeps voltage-regulated for a first predetermined duration. When the voltage-variation circuit 10 maintains voltage-regulated, the scanning signal received through the input terminal shifts from high voltage level to low voltage level. Afterwards, the shifted scanning signal is transmitted to the scanning line GATE (m). The voltage-variation circuit 10 shifts to be the conduct state after having maintained voltage-regulated for the first predetermined duration. When the voltage-variation circuit 10 keeps conduct state, the voltage-variation circuit 10 directly transmits the scanning signal received through the input terminal to the scanning line. The scanning signal is not processed by the voltage-variation circuit 10. In other words, the scanning signal at high voltage level received through the input terminal is still at high voltage level after being transmitted to the scanning line; the scanning signal at low voltage level received through the input terminal is still at low voltage level after being transmitted to the scanning line.

In another embodiment, the voltage-variation circuit 10 may be a gate circuit. For example, the voltage-variation circuit 10 is an AND gate including two input terminals. One terminal of the AND gate receives a clock signal Ckm supplied by a scanning driver. The clock signal Ckm is a scanning signal which is not processed by the voltage-variation circuit 10. The other terminal of the AND gate receives a square-wave signal. The output terminal of the AND gate is connected to the scanning line GATE(m). The square-wave signal is at low voltage level when the voltage-variation circuit is voltage-regulated. The square-wave signal is at the high voltage level when the voltage-variation circuit operates in the conduct state.

Further, other gate circuits may substitute for the voltage-variation circuit 10 as long as the waveform of a signal input through the other input terminal is well controlled.

In another embodiment, a selecting circuit 20 includes a first thin-film transistor (TFT) T1, a second TFT T2, and a third TFT T3.

An input terminal of the first TFT T1, an input terminal of the second TFT T2, and an input terminal of the third TFT T3 are connected with one another and are connected to one of the plurality of data lines S. An output terminal of the first TFT T1 is connected to the corresponding red subpixel unit of the pixel unit. The output terminal of the second TFT T2 is connected to the corresponding green subpixel unit of the pixel unit. The output terminal of the third TFT T3 is connected to the corresponding blue subpixel unit of the pixel unit.

In another embodiment, a pixel driving circuit further includes a selecting controller. The selecting controller is connected to a gate of a first thin-film transistor (TFT) T1, a gate of the second TFT T2, and a gate of the third TFT T3 respectively. The selecting controller is configured to control conduction and termination of the first TFT T1, the second TFT T2, and the third TFT T3. While one of the TFTs is turned on, the other TFTs are turned off.

Figure 6:
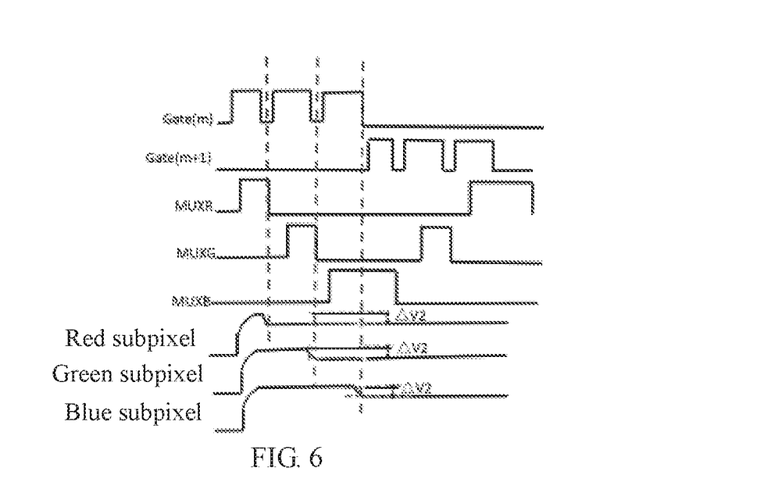
FIG. 6 illustrates a timing diagram of signals applied on the pixel driving circuit of FIG. 5 and voltage drops applied on a pixel unit.

Please refer to FIG. 6 illustrating a driving timing diagram of the pixel driving circuit according to the present disclosure. The timing of operation and computation is controlled by the TCON in a driving chip each time to ensure that the scanning signal output through the scan line Gate(m) is also at a low voltage level at the same time when the MUXR and MUXG are at falling edge. In other words, the scanning signal output through the scanning line Gate(m) is also at low voltage level while the signal output through the first output terminal shifts from the high voltage level to the low voltage level or while the signal output through the second output terminal of the selecting circuit 20 shifts from the high voltage level to the low voltage level. Because the output terminal of the selecting circuit 20 and the corresponding scanning signal are both at low voltage level, the voltage drop ΔV1 of the data voltage level does not occur due to capacitive coupling, thereby ensuring that the voltage drop ΔV2 of the data voltage level of the red/green/blue subpixel units is the same. Therefore, the voltage drop ΔV2 of the data voltage level of the red/green/blue subpixel units (the R/G/B subpixel units) is all the same when the red/green/blue subpixel units are charged to ensure that the grayscale of all of the subpixels display is identical so as to avoid color shift due to inconsistent voltage.

Figure 7:
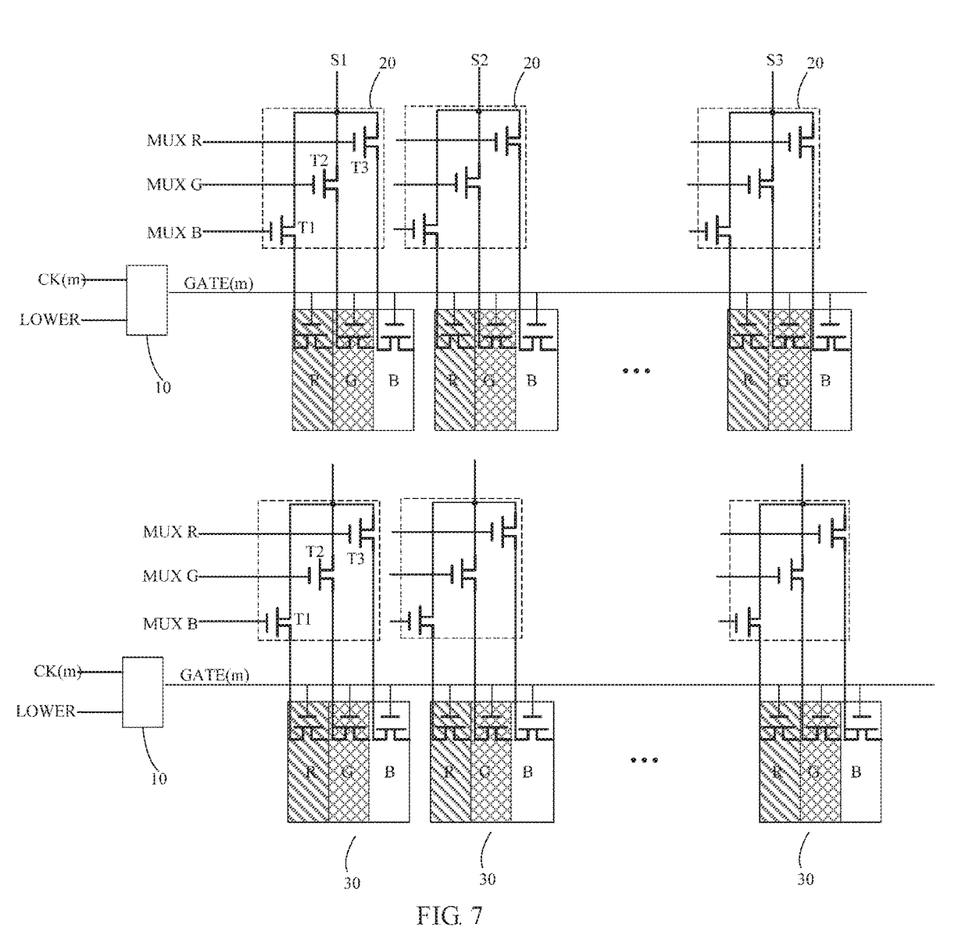
FIG. 7 illustrates a circuit diagram of a liquid crystal display circuit according to an embodiment of the present disclosure.

Please refer to FIG. 7 illustrating a schematic diagram of the structure of a liquid crystal display circuit according to another embodiment of the present disclosure. The liquid crystal display circuit includes a pixel structure and a pixel driving circuit. The pixel driving circuit is configured to drive the pixel structure. The pixel structure includes a plurality of pixel units arranged in a matrix. Each of the plurality of pixel units includes three subpixel units, a red subpixel unit, a green subpixel unit, and a blue subpixel unit.

The pixel driving circuit includes a plurality of voltage-variation circuits 10, a plurality of data lines S, a plurality of selecting circuits 20, and a plurality of scanning lines GATE(m).

An input terminal of each of the plurality of data lines S receives a data signal.

Each of the selecting circuits 20 includes a data input terminal, a first output terminal, a second output terminal, and a third output terminal. The data input terminal is connected to the output terminal of one of the plurality of data lines S. The first output terminal is connected to the corresponding red subpixel unit of the pixel unit. The second output terminal is connected to the corresponding green subpixel unit of the pixel unit. The third output terminal is connected to the corresponding blue subpixel unit of the pixel unit.

Each of the plurality of scanning lines GATE(m) is connected to each of the plurality of subpixel units of one or more pixel unit.

An input terminal of each of the plurality of voltage-variation circuits 10 receives the scanning signal. An output terminal of each of the plurality of voltage-variation circuits 10 is connected to a scanning line. Each of the plurality of voltage-variation circuits 10 is configured to process the scanning signal and afterwards transmits the processed scanning signal to one of the plurality of scanning lines GATE(m).

Each of the plurality of voltage-variation circuits 10 may be selectively operable in a voltage-regulated state or a conduct state. When a signal output through the first output terminal of the selecting circuit 20 shifts from high voltage level to low voltage level or a signal output through the second output terminal of the selecting circuit 20 shifts from high voltage level to low voltage level, the voltage-variation circuit 10 shifts to be voltage-regulated and keeps voltage-regulated for a first predetermined duration. When the voltage-variation circuit 10 maintains voltage-regulated, the scanning signal received through the input terminal shifts from high voltage level to low voltage level. Afterwards, the shifted scanning signal is transmitted to the scanning line GATE(m). The voltage-variation circuit 10 shifts to be the conduct state after having maintained voltage-regulated state for the first predetermined duration. When the voltage-variation circuit 10 keeps conduct state, the voltage-variation circuit 10 directly transmits the scanning signal received through the input terminal to the scanning line. The scanning signal is not processed by the voltage-variation circuit 10. In other words, the scanning signal at high voltage level received through the input terminal is still at high voltage level after being transmitted to the scanning line; the scanning signal at low voltage level received through the input terminal is still at low voltage level after being transmitted to the scanning line.

In another embodiment, the voltage-variation circuit 10 may be a gate circuit. For example, the voltage-variation circuit 10 is an AND gate including two input terminals. One terminal of the AND gate receives a clock signal Ckm supplied by a scanning driver. The clock signal Ckm is a scanning signal which is not processed by the voltage-variation circuit 10. The other terminal of the AND gate receives a square-wave signal. The output terminal of the AND gate is connected to the scanning line GATE(m). The square-wave signal is at low voltage level when the voltage-variation circuit is voltage-regulated. The square-wave signal is at the high voltage level when the voltage-variation circuit operates in the conduct state.

Further, other gate circuits may substitute for the voltage-variation circuit 10 as long as the waveform of a signal input through the other input terminal is well controlled.

In another embodiment, a selecting circuit 20 includes a first thin-film transistor (TFT) T1, a second TFT T2, and a third TFT T3.

An input terminal of the first TFT T1, an input terminal of the second TFT T2, and an input terminal of the third TFT T3 are connected with one another and are connected to one of the plurality of data lines S. An output terminal of the first TFT T1 is connected to the corresponding red subpixel unit of the pixel unit. The output terminal of the second TFT T2 is connected to the corresponding green subpixel unit of the pixel unit. The output terminal of the third TFT T3 is connected to the corresponding blue subpixel unit of the pixel unit.

In another embodiment, a pixel driving circuit further includes a selecting controller. The selecting controller is connected to a gate of a first thin-film transistor (TFT) T1, a gate of the second TFT T2, and a gate of the third TFT T3 respectively. The selecting controller is configured to control conduction and termination of the first TFT T1, the second TFT T2, and the third TFT T3. While one of the TFTs is turned on, the other TFTs are turned off.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A pixel driving circuit, configured to drive a pixel structure having a plurality of pixel units, each of the plurality of pixel units comprising a red subpixel unit, a green subpixel unit, and a blue subpixel unit, the pixel driving circuit comprising:

a plurality of data lines, an input terminal of each of the plurality of data lines receiving a data signal;

a plurality of selecting circuits, each of the selecting circuits comprising a data input terminal connected to one of the plurality of data lines, a first output terminal connected to a red subpixel unit of a pixel unit, a second output terminal connected to a green subpixel unit of the pixel unit, and a third output terminal connected to a blue subpixel unit of the pixel unit;

a plurality of scanning lines, each connected to one of the subpixel units of the pixel units;

a plurality of voltage-variation circuits, each of the voltage-variation circuits comprising an input terminal configured to receive the scanning signal, an output terminal connected to one of the plurality of scanning lines, wherein each of the plurality of voltage-variation circuits is selectively operable in a voltage-regulated state or a conduct state;

wherein in response to a transition of signal output by the first output terminal from a high voltage level to a low voltage level or a transition of signal output by the second output terminal from the high voltage level to the low voltage level, the voltage-variation circuit switches to the voltage-regulated state for a first predetermined duration so that scanning signal output to the subpixel unit shifts from the high voltage level to the low voltage level, and the voltage-variation circuit switches to be the conduct state after the first predetermined duration;

wherein the voltage-variation circuit is a gate circuit comprising a first input terminal configured to receive a scanning signal, a second input terminal configured to receive a square-wave signal, and an output terminal connected to one of the scanning lines;

wherein the selecting circuit comprises a first thin-film transistor (TFT), a second TFT, and a third TFT; an input terminal of the first TFT, an input terminal of the second TFT, and an input terminal of the third TFT are connected to one of the plurality of data lines; an output terminal of the first TFT is connected to the red subpixel unit of the pixel unit; the output terminal of the second TFT is connected to the green subpixel unit of the pixel unit; the output terminal of the third TFT is connected to the blue subpixel unit of the pixel unit.

2. The pixel driving circuit of claim 1, wherein the gate circuit is an AND gate; the square-wave signal is at low voltage level on the voltage-regulated state; the square-wave signal is at high voltage level on the conduct state.

3. The pixel driving circuit of claim 1 further comprising a selecting controller connected to a gate of the first TFT, a gate of the second TFT, and a gate of the third TFT.

4. The pixel driving circuit of claim 1, wherein all of the first TFT, second TFT and third TFT are N-channel metal oxide semiconductor (NMOS) transistors.

5. A pixel driving circuit, configured to drive a pixel structure having a plurality of pixel units, each of the plurality of pixel units comprising a red subpixel unit, a green subpixel unit, and a blue subpixel unit, the pixel driving circuit comprising:

a plurality of data lines, an input terminal of each of the plurality of data lines receiving a data signal;

a plurality of selecting circuits, each of the selecting circuits comprising a data input terminal connected to one of the plurality of data lines, a first output terminal connected to a red subpixel unit of a pixel unit, a second output terminal connected to a green subpixel unit of the pixel unit, and a third output terminal connected to a blue subpixel unit of the pixel unit;

a plurality of scanning lines, each connected to one of the subpixel units of the pixel units;

a plurality of voltage-variation circuits, each of the voltage-variation circuits comprising an input terminal configured to receive the scanning signal, an output terminal connected to one of the plurality of scanning lines, wherein each of the plurality of voltage-variation circuits is selectively operable in a voltage-regulated state or a conduct state;

wherein in response to a transition of signal output by the first output terminal from a high voltage level to a low voltage level or a transition of signal output by the second output terminal from the high voltage level to the low voltage level, the voltage-variation circuit switches to the voltage-regulated state for a first predetermined duration so that scanning signal output to the subpixel unit shifts from the high voltage level to the low voltage level, and the voltage-variation circuit switches to be the conduct state after the first predetermined duration.

6. The pixel driving circuit of claim 5, wherein the voltage-variation circuit is a gate circuit comprising a first input terminal configured to receive a scanning signal, a second input terminal configured to receive a square-wave signal, and an output terminal connected to one of the scanning lines.

7. The pixel driving circuit of claim 6, wherein the gate circuit is an AND gate; the square-wave signal is at low voltage level on the voltage-regulated state; the square-wave signal is at high voltage level on the conduct state.

8. The pixel driving circuit of claim 6, wherein the selecting circuit comprises a first thin-film transistor (TFT), a second TFT, and a third TFT; an input terminal of the first TFT, an input terminal of the second TFT, and an input terminal of the third TFT are connected to one of the plurality of data lines; an output terminal of the first TFT is connected to the red subpixel unit of the pixel unit; the output terminal of the second TFT is connected to the green subpixel unit of the pixel unit; the output terminal of the third TFT is connected to the blue subpixel unit of the pixel unit.

9. The pixel driving circuit of claim 8 further comprising a selecting controller connected to a gate of the first TFT, a gate of the second TFT, and a gate of the third TFT.

10. The pixel driving circuit of claim 9, wherein all of the first TFT, second TFT and third TFT are N-channel metal oxide semiconductor (NMOS) transistors.

11. A liquid crystal display circuit comprising a pixel driving circuit and a pixel structure having a plurality of pixel units, each of the plurality of pixel units comprising a red subpixel unit, a green subpixel unit, and a blue subpixel unit, the pixel driving circuit comprising:
- a plurality of data lines, an input terminal of each of the plurality of data lines receiving a data signal;
- a plurality of selecting circuits, each of the selecting circuits comprising a data input terminal connected to one of the plurality of data lines, a first output terminal connected to a red subpixel unit of a pixel unit, a second output terminal connected to a green subpixel unit of the pixel unit, and a third output terminal connected to a blue subpixel unit of the pixel unit;
- a plurality of scanning lines, each connected to one of the subpixel units of the pixel units;
- a plurality of voltage-variation circuits, each of the voltage-variation circuits comprising an input terminal configured to receive the scanning signal, an output terminal connected to one of the plurality of scanning lines, wherein each of the plurality of voltage-variation circuits is selectively operable in a voltage-regulated state or a conduct state;
- wherein in response to a transition of signal output by the first output terminal from a high voltage level to a low voltage level or a transition of signal output by the second output terminal from the high voltage level to the low voltage level, the voltage-variation circuit switches to the voltage-regulated state for a first predetermined duration so that scanning signal output to the subpixel unit shifts from the high voltage level to the low voltage level, and the voltage-variation circuit switches to be the conduct state after the first predetermined duration.

12. The liquid crystal display circuit of claim 11, wherein the voltage-variation circuit is a gate circuit comprising a first input terminal configured to receive a scanning signal, a second input terminal configured to receive a square-wave signal, and an output terminal connected to one of the scanning lines.

13. The liquid crystal display circuit of claim 12, wherein the gate circuit is an AND gate; the square-wave signal is at low voltage level on the voltage-regulated state; the square-wave signal is at high voltage level on the conduct state.

14. The liquid crystal display circuit of claim 11, wherein the selecting circuit comprises a first thin-film transistor (TFT), a second TFT, and a third TFT; an input terminal of the first TFT, an input terminal of the second TFT, and an input terminal of the third TFT are connected to one of the plurality of data lines; an output terminal of the first TFT is connected to the red subpixel unit of the pixel unit; the output terminal of the second TFT is connected to the green subpixel unit of the pixel unit; the output terminal of the third TFT is connected to the blue subpixel unit of the pixel unit.

15. The liquid crystal display circuit of claim 14, wherein the pixel driving circuit comprises a selecting controller connected to a gate of the first TFT, a gate of the second TFT, and a gate of the third TFT.

16. The liquid crystal display circuit of claim 15, wherein all of the first TFT, second TFT and third TFT are N-channel metal oxide semiconductor (NMOS) transistors.

* * * * *